United States Patent
Anderson et al.

(10) Patent No.: US 6,610,942 B1
(45) Date of Patent: Aug. 26, 2003

(54) SWITCH ASSEMBLY FOR FOOD WASTE DISPOSER

(75) Inventors: Scott W. Anderson, Racine, WI (US); James Hansche, Racine, WI (US); Michael Beers, Elmhurst, IL (US)

(73) Assignee: Emerson Electric Co., St. Louis, MO (US)

( * ) Notice: Subject to any disclaimer, the term of this patent is extended or adjusted under 35 U.S.C. 154(b) by 0 days.

(21) Appl. No.: 10/196,599

(22) Filed: Jul. 16, 2002

(51) Int. Cl.[7] .......................... H01H 1/58; H01H 35/10; H02H 7/08; H02K 11/00
(52) U.S. Cl. ................... 200/80 R; 200/293; 310/68 A; 310/68 E; 310/71
(58) Field of Search .................. 200/80 R, 80 A, 200/80 B, 241–251, 293; 241/46.01–46.08; 310/68 R, 68 A–68 E, 71

(56) References Cited

U.S. PATENT DOCUMENTS

| | | | |
|---|---|---|---|
| 3,154,650 A | * 10/1964 | Brucken et al. | 200/80 R |
| 3,691,415 A | * 9/1972 | Hancock et al. | 310/68 E |
| 3,790,730 A | * 2/1974 | Wyland | 200/80 R X |
| 3,875,462 A | * 4/1975 | Kiefer et al. | 310/68 C X |
| 4,298,243 A | 11/1981 | Swengel, Jr. et al. | 339/276 |
| 4,421,375 A | 12/1983 | Coldren | 339/97 R |
| 4,473,789 A | * 9/1984 | Hildebrandt et al. | 310/68 E X |
| 4,665,286 A | * 5/1987 | Hansen | 200/80 R |
| 5,174,022 A | 12/1992 | Philips et al. | 29/863 |
| 5,636,731 A | * 6/1997 | Schaefer | 200/293 |
| 6,007,006 A | * 12/1999 | Engel et al. | 241/46.014 |

OTHER PUBLICATIONS

Photographs of a prior art switch assembly of In–Sink–Erator, a division of Emerson Electric Co., 6–pages.
Photographs of a prior art switch assembly of Whiterock Corporation of China, 6–pages.
Tyco Electronics/ AMP Incorporated Specification, "Ultra–Pod FASTON Fully Insulated Receptacles and Tabs," dated Feb. 19, 200, 26–pages.
AMP Incorporated Catalog 82004, "Ultra–Pod Fully Insulated FASTON Receptacles," revised Feb., 1998, 1–page.
AMP Incorporated Catalog 82004, "250 Series Flag 'F–crimp' Insulation Support," revised Feb., 1999, 1–page.
AMP Incorporated Specification Sheet, "Insulated Right Angle Quick Connectors," undated, 1–page.
AMP Incorporated Customer Drawing, "Assembly, Receptacle, Flag, Ultra–Pod, 6.35 Series," dated Jul. 8, 1993, 1–page.

* cited by examiner

Primary Examiner—J. R. Scott
(74) Attorney, Agent, or Firm—Howrey, Simon, Arnold & White, LLP (57) ABSTRACT

A switch assembly usable in a food waste disposer is disclosed having several improvements over the prior art. The switch assembly positively retains an overload switch, making assembly of the switch into the disposer easier. The switch assembly includes terminals, which attach to the start and run windings of the disposer. The terminals are arranged in a uniform direction along a single side of the switch assembly. This arrangement allows a single, integrated connector of winding leads to be easily connected to the switch assembly, facilitating assembly and reducing the possibility of incorrectly wiring the disposer during construction.

26 Claims, 10 Drawing Sheets

SWITCH ASSEMBLY FOR FOOD WASTE DISPOSER

CROSS-REFERENCE TO RELATED APPLICATIONS

This application is concurrently filed with U.S. Design patent application Ser. No. 29/163,986 which is entitled "Switch Assembly" and contains subject matter related to that disclosed herein.

FIELD OF THE INVENTION

The present invention relates generally to food waste disposers and, more particularly to a switch assembly for use in a food waste disposer.

BACKGROUND OF THE INVENTION

Figure 1:
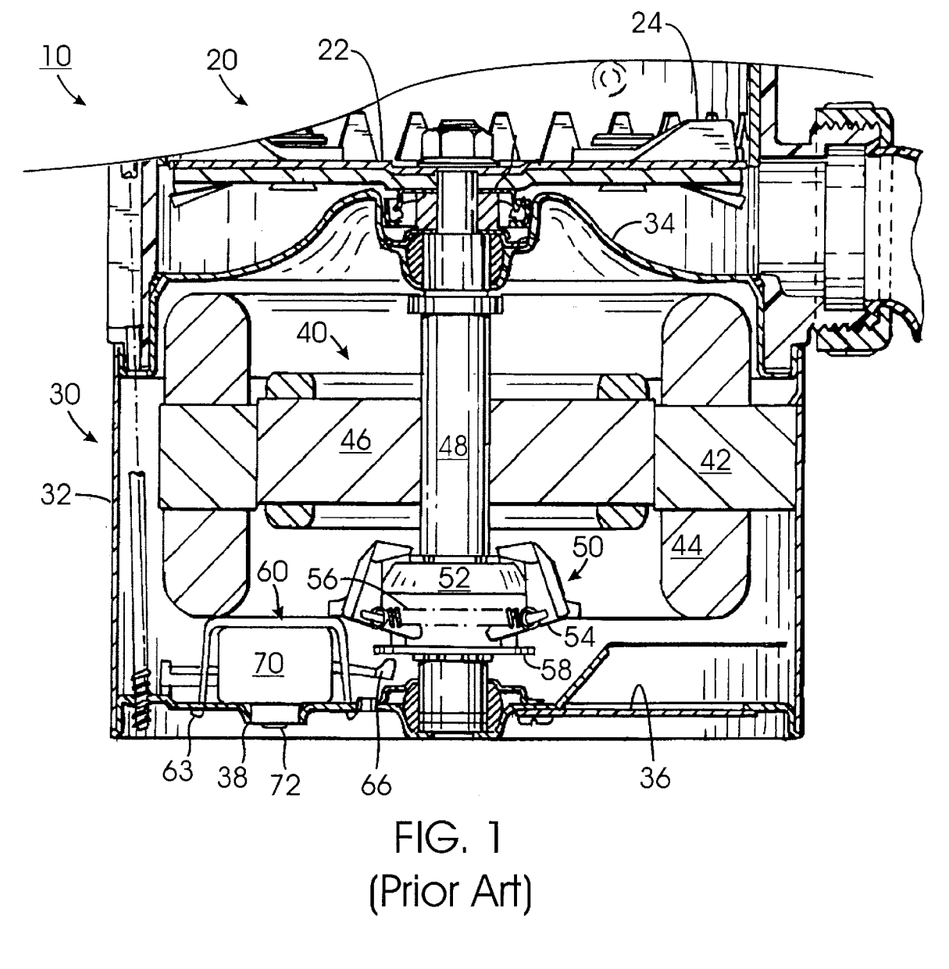
FIG. 1 illustrates a cross-sectional view of part of a conventional food waste disposer.

Referring to FIG. 1, a portion of a conventional food waste disposer 10 is illustrated in a cross-sectional view. The conventional disposer 10 includes an upper food conveying section (not shown), a lower motor section 30, and a central grinding section 20 disposed between the food conveying section and the motor section 30. The food conveying section conveys food waste and water to the central grinding section 20. The central grinding section 20 includes a grinding plate 22 containing grinding lugs 24.

The motor section 30 includes an induction motor 40, enclosed within a motor housing 32 having an upper end frame 34 and a lower end frame 36. The motor 40 includes a stator 42 and a rotor 46. The stator 42 includes windings 44. The rotor 46 is disposed on a motor shaft 48. The motor 40 imparts rotational movement to the motor shaft 48, which turns the grinding plate 22 of the grinding section 20.

The motor shaft 48 includes a mechanical or centrifugal actuator 50 disposed adjacent the lower end frame 36. The centrifugal actuator 50 includes a body 52 attached to the motor shaft 48. Two weights 54 are pivotably connected to the body 52 and are biased together by one or more springs 56. The spring-loaded weights 54 move a movable plate 58 disposed about the motor shaft 48, as will be explained in more detail later.

A switch assembly 60 is attached to the lower end frame 36 adjacent the motor shaft 48 and centrifugal actuator 50. In particular, tabs 63 on the switch assembly 60 are press fit through apertures defined in the lower end frame 36. The switch assembly 60 includes an internal switch having a lever arm or blade 66 in contact with the movable plate 58 of the centrifugal actuator 50. When a certain rotational speed is reached by the motor 40, the spring-loaded weights 54 of the centrifugal actuator 50 move apart due to centrifugal force. The separation of the weights 54 causes the movable plate 58 to lift. In contact with the movable plate 58, the lever arm or blade 66 moves upward and an electrical connection is broken within the internal switch of the switch assembly 60. Typically, the electrical connection is broken when the motor reaches approximately 1500 to 1600 r.p.m. for 60 Hz. Motors or 1300 to 1400 r.p.m. for 50 Hz. motors and may occur within about 0.3 seconds from start-up. As will be discussed in more detail below, the internal switch, lever arm or blade 66, and centrifugal actuator 50 work in conjunction to control power to the windings 44 of the motor 40.

The switch assembly 60 houses an overload switch 70, which is typically a separately manufactured component. The overload switch 70 is used to cut power to the motor 40 under certain conditions. The overload switch 70 includes a reset button 72 disposed through an aperture 38 in the lower end frame 36. The reset button 72 allows a user to reset the overload switch 70 from outside the disposer 10.

Figure 2A:
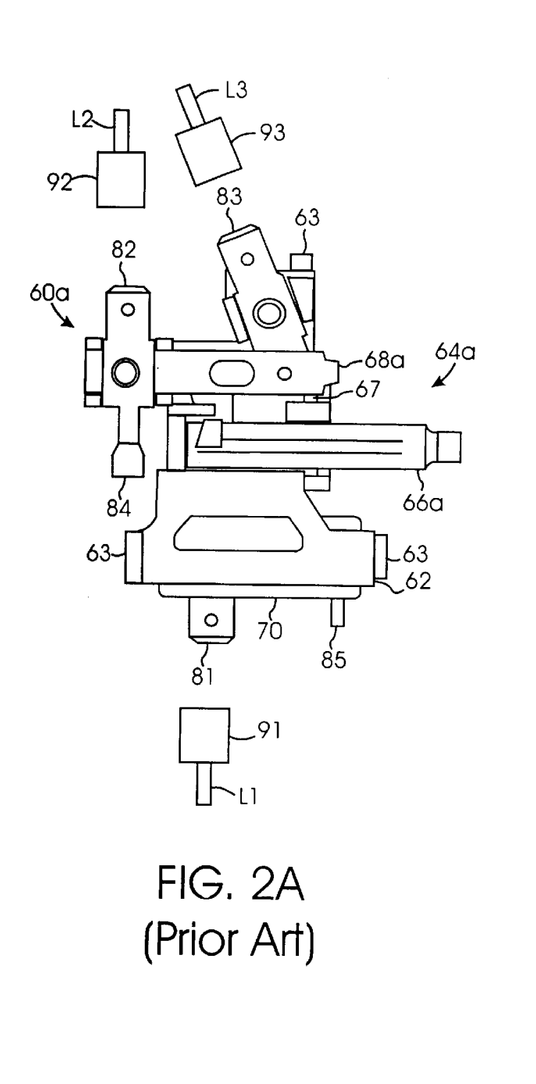
FIG. 2A illustrates a top view of a switch assembly according to the prior art.
Figure 2B:
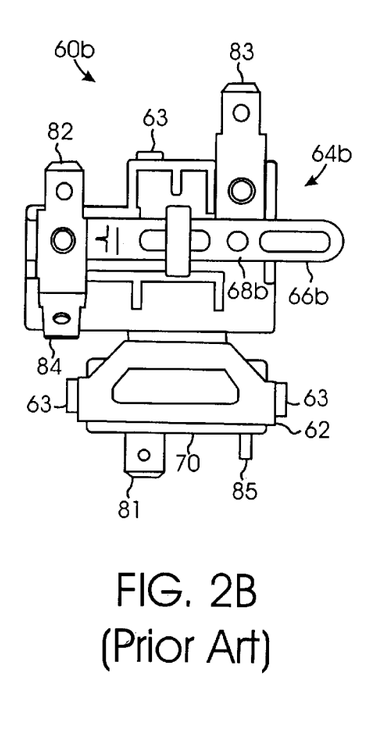
FIG. 2B illustrates a top view of another switch assembly according to the prior art.

Referring to FIGS. 2A and 2B, top views of two switch assemblies 60a and 60b according to the prior art are illustrated for use with the conventional disposer 10. In FIG. 2A, the switch assembly 60a represents a start switch used in a food waste disposer produced by. In-Sink-Erator®, a division of Emerson Electric Co. In FIG. 2B, the switch assembly 60b represents a start switch produced by Whiterock Corporation of China.

The switch assembly 60a or 60b includes a body 62 that attaches to the lower end frame with retainers or tabs 63. The body 62 includes a contact switch 64a or 64b and houses the overload switch 70. The overload switch 70 may be, for example, a switch manufactured by Thermodisc Incorporated, a subsidiary of Emerson Electric Co., having a type 30M frame style. The overload switch 70 includes a terminal 81 and a connection point 85.

In the switch assembly 60a of FIG. 2A, the contact switch 64a includes a plastic ever arm 66a pivotally connected to the body 62 and biased open by a spring (not shown). As described above in FIG. 1, the plastic lever arm 66a moves with the movable plate 58 of the centrifugal actuator 50. A flexible, conductive blade 68a is connected to and movable with the lever arm 66a. The blade 68a is electrically connected to the terminals 82 and 84. In contrast to the switch assembly 60a of FIG. 2A, the lever arm 66b and flexible blade 68b of the contact switch 60b in FIG. 2B are an integral conductive piece. Despite this difference, the contact switch 64b operates in a substantially similar fashion to the contact switch 64a of FIG. 2A.

Figure 2C:
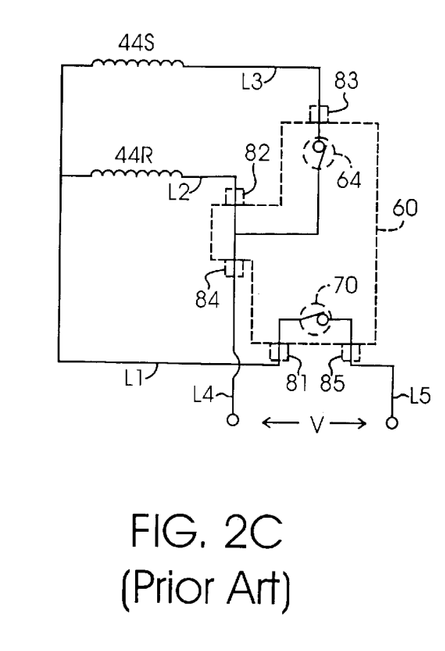
FIG. 2C illustrates an electrical schematic of the prior art switch assemblies of FIGS. 2A–B.

Referring to FIG. 2C, an electrical schematic of a switch assembly 60 according to the prior art such as assembly 60a or 60b, is illustrated. The switch assembly 60 is connected to leads L1–L3 from the motor of the disposer. The motor has run windings 44R and start windings 44S. The switch assembly 60 is also connected to leads L4–L5 from a power supply V.

The terminal 81 of the overload switch 70 connects in parallel to the windings 44S and 44R, and the connection point 85 connects to the power source V. Thus, the overload switch 70 can cut power to the windings 44S and 44R in case of a power overload. The terminal 82 is connected to the lead L2 from the run windings 44R. The terminal 83 is connected to the lead L3 from the start windings 44S. The terminal 84 is connected to the lead L4 from the power source V.

The contact switch 64 of the switch assembly 60 is used to control activation of the start windings 44S. At initial start-up of the motor 40, the contact switch 64 is closed so that the start and run windings 44S and 44R are both engaged. The start windings 44S are initially used in combination with the run windings 44R to overcome inertial forces of the rotor, shaft, and grinding plate of the disposer, in addition to other forces. After a certain point and in response to movement of the movable plate 58 of the centrifugal actuator 50, the contact switch 64 interrupts electrical connection between the power source V connected to terminal 84 and the start windings 44S connected to terminal 83, effectively shutting off the start windings 44S.

Although the switch assemblies 60a and 60b of FIGS. 2A and 2B operate efficiently and effectively, manufacturers continually strive to improve the efficiency of, and hence reduce the cost of, the manufacture and assembly of such switches and of the disposers in which they are contained. Unfortunately, the prior art switch assemblies have some drawbacks, which prevent these goals from being reached.

For example, the switch assemblies 60a and 60b according to the prior art are relatively difficult to install in the disposer 10. As noted above in FIG. 1, the switch assembly 60a or 60b includes tabs 63 that press fit into slots defined in the lower end frame 36. The overload switch 70 includes a reset button 72 that extends from the bottom of the switch assembly 60a or 60b and is disposed through the hole 38 in the lower end frame 36. During assembly, an operator manually positions the overload switch 70 within the housing 62 before attaching the assembly 60a or 60b to the lower end frame 36. However, the switch assembly 60a or 60b does not positively retain the overload switch 70. Consequently, the operator must hold the overload switch 70 in the assembly 60a or 60b while simultaneously pushing the tabs 63 into the slots defined in the lower end frame 36 and disposing the reset button 72 in the hole 38. Thus, the attachment of the assembly 60a or 60b to the lower end frame 36 requires manual dexterity from the operators, making the assembly process difficult.

In another drawback, the connection of leads to the switch assembly 60a or 60b offers further challenges to the assembly of the disposer. As shown in FIG. 2C, the switch assembly 60a or 60b has five terminals (81–85) that must be connected to the leads L1–L5 from the power source and motor. An operator typically performs some of these connections manually by press fitting a terminal connector connected to each lead onto the relevant terminal.

For example, for the switch 60a depicted in FIG. 2A, the terminals 81–83 extend in three different directions. The terminals 81–83 receive separate terminal connectors 91–93 connected to leads L1–L3 in three mating operations. In general, there is no guidance or built-in system for determining or indicating what lead attaches to which terminal. Consequently, the possibility of incorrectly wiring the leads to the switch assembly 60a is increased. Furthermore, the operator must attach each lead one at a time. Such difficult or time-consuming operations complicate the assembly of the disposer. Moreover, the terminals 81–83 in the prior art configurations of FIGS. 2A and 2B appear on different sides of their switch assemblies, making automated assembly difficult The present invention is directed to overcoming, or at least reducing the effects of, one or more of the problems set forth above.

SUMMARY OF THE INVENTION

A switch assembly usable in a food waste disposer is disclosed having several improvements over the prior art. The switch assembly positively retains an overload switch, making assembly of the switch into the disposer easier. The switch assembly includes terminals, which attach to the start and run windings of the disposer. The terminals are arranged in a uniform direction along a single side of the switch assembly. This arrangement allows a single, integrated connector of winding leads to be easily connected to the switch assembly, facilitating assembly and reducing the possibility of incorrectly wiring the disposer during construction.

BRIEF DESCRIPTION OF THE DRAWINGS

The forgoing summary, a preferred embodiment, and other aspects of the present invention will be best understood with reference to the following detailed description of specific embodiments of the invention when read in conjunction with the accompanying drawings, in which:

FIGS. 4A–4C illustrate various views of an embodiment of a connector assembly according to the present invention for use with the switch assembly of FIGS. 4A–4C.

While the invention is susceptible to various modifications and alternative forms, specific embodiments have been shown by way of example in the drawings and will be described in detail herein. However, it should be understood that the invention is not intended to be limited to the particular forms disclosed. Rather, the invention is to cover all modifications, equivalents, and alternatives falling within the scope of the invention as defined by the appended claims.

DETAILED DESCRIPTION OF PREFERRED EMBODIMENTS

In the interest of clarity, not all features of actual implementations are described in the disclosure that follows. It will of course be appreciated that in the development of any such actual implementations, as in any such project, numerous engineering and design decisions must be made to achieve the developers' specific goals (e.g., compliance with mechanical-related and business-related constraints), which will vary from one implementation to another. Moreover, attention will necessarily be paid to proper engineering and design practices for the environment in question. It will be appreciated that such development efforts might be complex and time-consuming, but would nevertheless be a routine undertaking for those of skill in the art having the benefit of the present disclosure.

Figure 3:
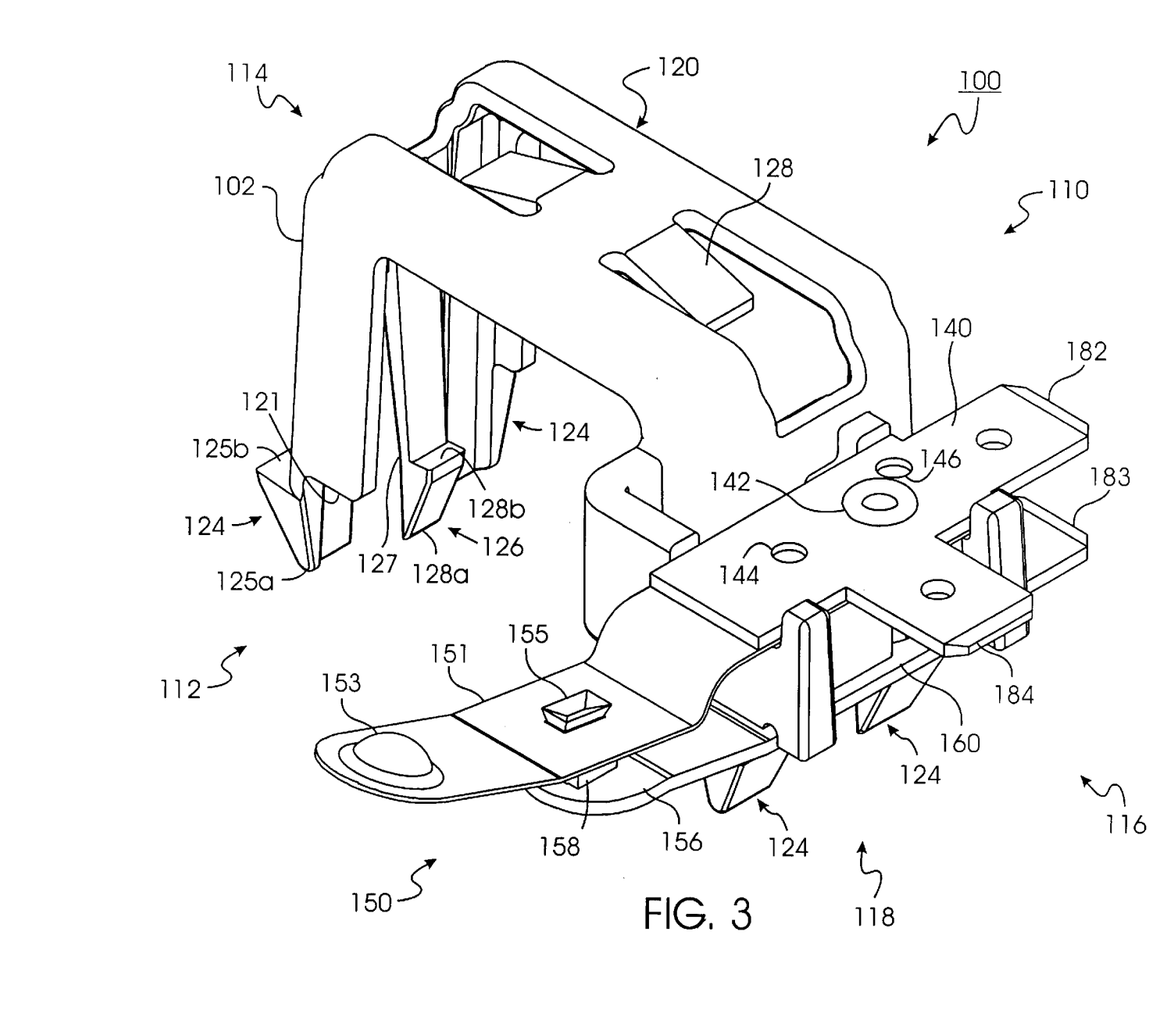
FIG. 3 illustrates an embodiment of a switch assembly according to the present invention.

Referring to FIG. 3, an embodiment of a switch assembly 100 according to the present invention is illustrated. In FIG. 3, the switch assembly 100 is illustrated in a perspective view without an overload switch, which may be a separately produced and self-contained component. The switch assembly 100 has first and second sides 110 and 112, first and second ends 114 and 116, and a bottom 118. The bottom 118 of the switch assembly 100 mounts to a lower end frame (not shown) of a disposer as described below.

The switch assembly includes a body 102, a first plate 140, a second plate 160, and a contact switch 150. The body 102 is preferably composed of a non-conductive material, which is preferably polyester. The body 102 defines a housing 120 for an overload switch (not shown) adjacent the first end 114. The housing 120 includes first retainers 124, second retainers 126, and biasing tabs 128.

The first retainers 124 are disposed on the corners of the housing 120. Having a triangular cross-section, the first retainers 124 include angled leading edges 125a and define shoulders 125b. In addition, the first retainers 124 define ledges 121 with the housing 120. The shoulders 125b are disposed outside of the housing 120 and face toward the top of the assembly 100. During installation, the angled leading edges 125a are pressed into slots (not shown) defined in the lower end frame. Once installed, the shoulders 125b engage one side of the lower end frame, and the ledges 121 engage the opposite side of the lower end frame. Thus, the first retainers 124 retain the assembly 100 on the lower end frame of the disposer to resist inadvertent displacement from the lower end frame.

The second retainers 126 are disposed on the sides of the housing 120. The second retainers 126 include arms 127 angled slightly into the housing 120. On the arms 127, the second retainers 126 include angled leading edges 128a and define shoulders 128b. The shoulders 128b are disposed inside the housing 120 and face toward the top of the assembly 100. The shoulders 128b of the second retainers 126 are disposed at approximately the same level as the shoulders 125b of the first retainers 124.

As best described below, the second retainers 126 temporarily hold the overload switch (not shown) in the housing 120 when installing the assembly 100 with overload switch on the lower end frame. Furthermore, during installation, the angled leading edges 128a of the second retainers 126 are pressed into slots (not shown) defined in the lower end frame, and the shoulders 128b engage one side of the lower end frame. Thus, the second retainers 126 also retain the assembly 100 on the lower end frame to resist inadvertent displacement of the assembly 100 therefrom. The tabs 128 are disposed on the top of the housing 120 and contact or press firmly against the overload switch.

The first plate 140, the second plate 160, and the contact switch 150 are attached on the second end 116 of the body 102. The first plate 140 is attached to the topside of the second end 116 with a fastener 142. The fastener 142 is preferably be a one-piece eyelet composed of brass. The first plate 140 is composed of conductive material, which is preferably strip brass, and has an approximate thickness of 0.032-inch. The first plate 140 includes a terminal 182 for attachment to a lead from the motor as described below and includes a terminal 184 for attachment to a lead from the power source as described below.

The second plate 160 is also attached to the end 116 of the body 102 and is disposed substantially parallel to the first plate 140. The second plate 160 is attached to the bottomside of the second end 116 with a fastener or eyelet, which is best shown as fastener 162 in FIG. 4C below. The second plate 160 includes an aperture (not visible) allowing the eyelet 142 of the first plate 140 to be accessed when assembling the switch 100. Like the first plate 140, the second plate 160 is preferably composed of strip brass and preferably has an approximate thickness of 0.032-inch. The second plate 160 includes a terminal 183 for attachment to a lead from the motor as described below.

As explained previously, the contact switch 150 moves in conjunction with a mechanical or centrifugal actuator and acts to activate or deactivate the start windings of the motor in the disposer. The contact switch 150 includes a first conductive blade 151 and a second conductive blade 156, which provide power to the start windings when in contact. The first blade 151 is attached or staked to the first conductive plate 140. The second blade 156 is preferably formed as an integrated conductive piece with the second plate 160.

The first blade 151 includes a contact or bulbous dimple 153 on its distal end for contacting the centrifugal actuator of the disposer. The first blade 151 also includes a contact extension 155, which is preferably composed of copper with a top layer of silver oxide. The contact extension 155 makes electrical contact with a similar contact extension 158 of the second blade 156 of the contact switch 150 as described below. The first blade 151 may further include one or more bends and/or changes in width for biasing its contact with the centrifugal actuator.

In the present embodiment, the first plate 140 and first blade 151 are preferably stamped pieces that are staked together, which is a desirable configuration because the first blade 151 requires a material that bends while the terminals 182 and 184 of the first plate 140 require a more rigid material. In particular, one end of the first blade 151 is staked to the first plate 140 and is disposed against the body 102. The first blade 151 is preferably composed of strip phosphor bronze. However, the first plate 140 and first blade 151 may be an integral component composed of a conductive material offering both a sufficient degree of bending for a blade portion and a sufficient degree of rigidity for terminal portions.

For the present embodiment having staked pieces, the first plate 140 includes an aperture for the eyelet 142 and includes material staking areas or dimples 144 and 146 stamped in its surface. The first blade 151 also includes an aperture for the eyelet 142 and includes material staking areas that are not visible in FIG. 3 because they appear underneath the first plate 140. When the first blade 151 and first plate 140 are staked together the material staking areas of the first blade 151 align with the material staking areas 144 and 146 protruding from the bottom surface of the first plate 140. The material staking areas on the first plate 140 and the first blade 151 preferably, but not necessarily, have an asymmetrical arrangement with respect to the axis of symmetry for the plate 140 and the blade 151. In this way, the first plate 140 and first blade 151 may be properly staked together with the first blade 151 pointing and bending in the appropriate direction in relation to the terminals 182 and 184 on the first plate 140.

The second blade 156 of the contact switch 150 is preferably formed as part of the second plate 160. The second blade 156 includes the second contact extension 158, which is preferably composed of copper with a top layer of silver oxide. The second contact extension 158 establishes electrical connection with the first contact extension 155 of the first blade 151 when the first blade 151 is bent by the centrifugal actuator. The second blade 156 may include one or more bends and/or changes in width.

Figures 4A, 4B:
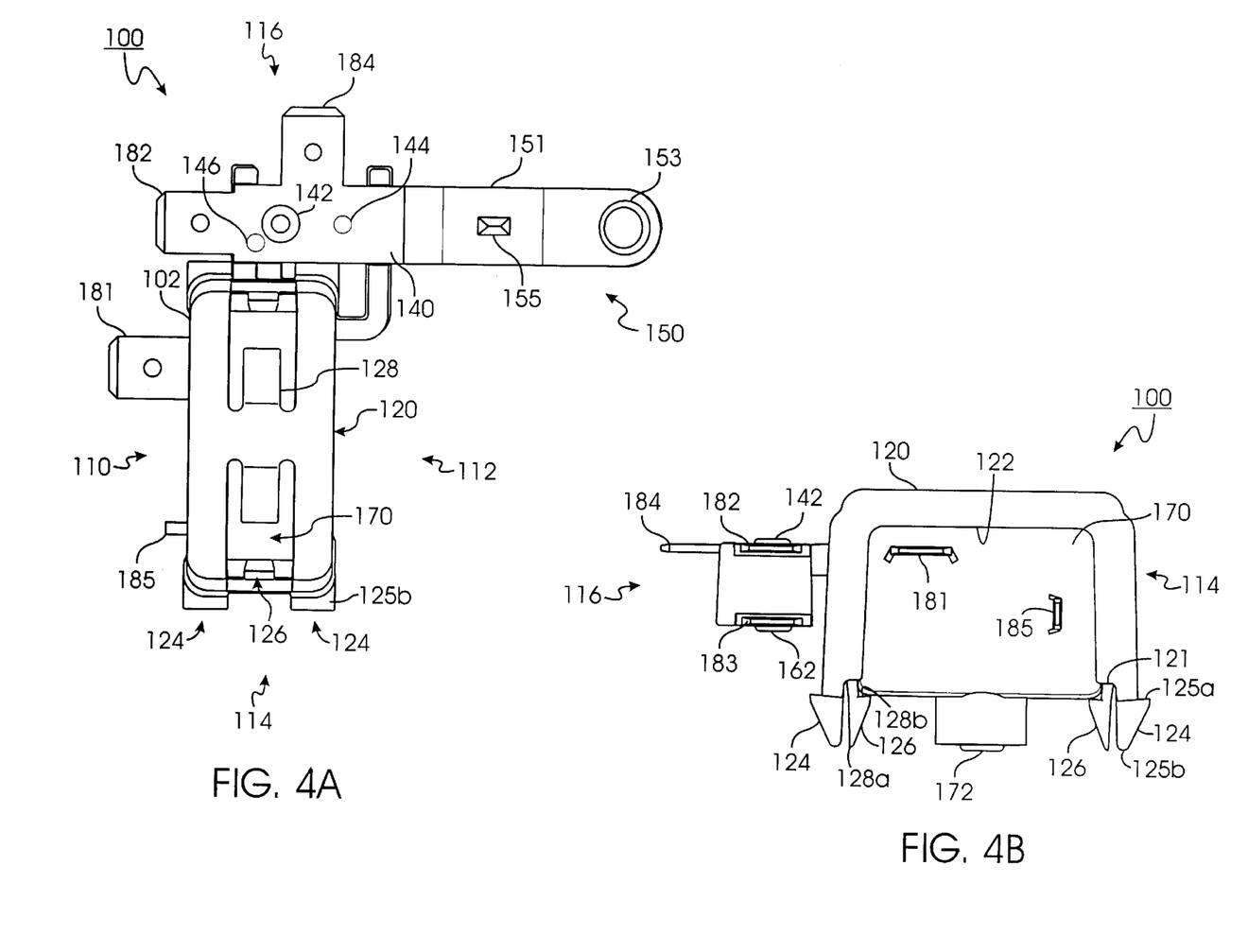
FIGS. 4A–4C illustrate various views of the switch assembly of FIG. 3 having an overload switch disposed therein.
Figure 4C:
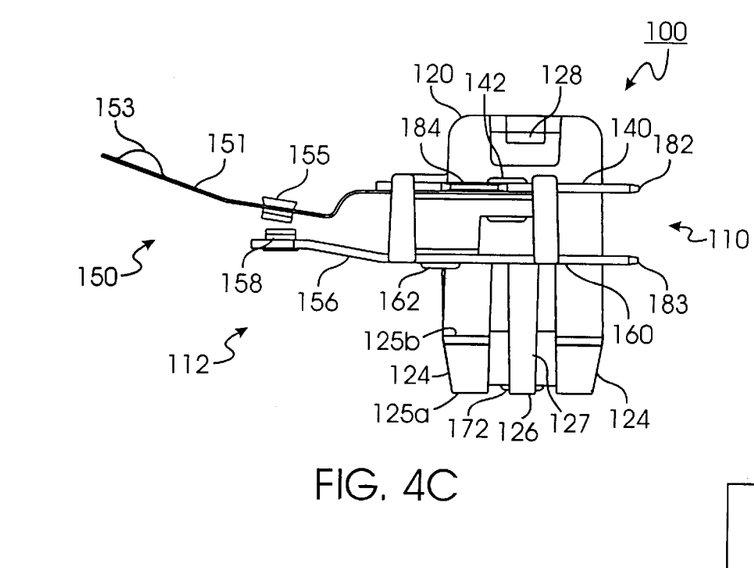
Figure 5:
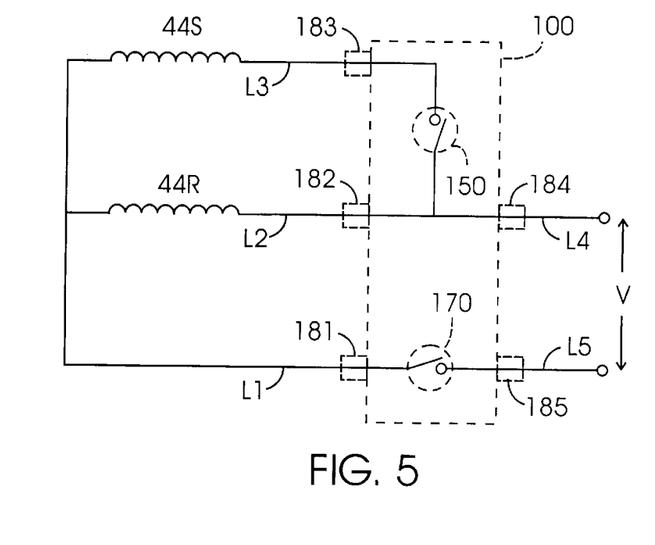
FIG. 5 illustrates an electrical schematic of the switch assembly with overload switch of FIGS. 4A–4C.

Referring to FIGS. 4A–4C, the switch assembly 100 with the overload switch 170 is illustrated and is shown in electrical schematic form in FIG. 5. The first blade 151 of the contact switch 150 is electrically connected to the terminals 182 and 184. The first blade 151 extends from the second side 112 of the assembly 100. The second blade 156 is electrically connected to the third terminal 183. The second blade 156 also extends from the second side 112 and extends adjacent the first blade 151 of the contact switch 150. The second blade 156 extends for a shorter length than the first blade 151.

As in the prior art, the contact switch 150 is normally open, but is held closed at initial start-up of the disposer by contact with the movable plate of the centrifugal actuator, as discussed in FIG. 1. The contact switch 150 opens as the first blade 151 bends upward when the movable plate is lifted by the centrifugal actuator. Contact between the first and second blades 151 and 156 breaks, and the start winding of the motor is electrically disconnected. As best shown in FIG. 5, opening of the contact switch 150 ends the electrical connection of the start winding 44S to the power source V and leaves only the run winding 44R connected to the power source V. As previously noted, this may typically occur when the motor reaches approximately 1500 to 1600 r.p.m. for 60 Hz. motors or 1300 to 1400 r.p.m. for 50 Hz. motors within about 0.3 seconds.

As is known in the art, a minimum load is required for holding the first and second blades 151 and 156 together. Furthermore, the contact switch 150 must accommodate any over travel of the centrifugal actuator, because the first blade 151 contacts the movable plate of the actuator. Therefore, the motion of the first blade 151 preferably accounts for possible differences in tolerance that are incurred during assembly of the disposer. Accommodating these differences ensures that the minimum load on the contact switch 150 is maintained when the centrifugal actuator is not activated.

Any wear on the blade tip 153 can decrease the load on the switch 150. The contour of the tip 153, preferably rounded, and the material of the blade 151, preferably strip phosphor bronze, can be suitably chosen to reduce any characteristic wear. Moreover, the material of the movable plate contacting the tip 153 can be composed of thermoset or thermoplastic to reduce any characteristic wear.

The housing 120 of the assembly 100 houses the overload switch 170 as noted earlier. The overload switch 170 may be and typically is a separately produced and self-contained component. Preferably, the overload switch 170 is manufactured by Thermodisc Incorporated, a subsidiary of Emerson Electric Co., having a type 30M frame style. The overload switch 170 includes a reset button 172, a terminal 181, and a connection point 185. The overload switch 170 is positioned within the housing 120 by insertion from the bottom 118 of the assembly 100. The housing 120 defines at least one open side 122 for the terminals 181 and 185 of the overload switch 170. Once installed in the housing 120, the terminal 181 and connection point 185 extends from the first side 110 of the assembly 100. As best shown in an electrical schematic of FIG. 5, the first terminal 181 of the assembly 100, which is associated with the overload switch 170, connects to the start windings 44S and run windings 44R of the motor. The fifth terminal or connection point 185 associated with the overload switch 170 connects to the power source V. Operating power usually consists either of 120 VAC at 60 Hz or 240 VAC at 50/60 Hz.

Returning to FIGS. 4A–4C and highlighting one inventive feature of the disclosed switch assembly, it should be noted that the switch assembly 100 positively retains or holds the overload switch 170 in the housing 120 during installation. As best shown in FIG. 4B, the second retainers 126 are angled slightly into the housing 120. The overload switch 170 inserts into the bottom of the housing 120, causing the arms of the retainers 126 to flex open to accommodate the width of the switch. Once fully inserted, the retainers 126 flex back as the switch 170 surpasses the shoulders 128b of the second retainers 126. The shoulders 128b then temporarily hold the overload switch 170 in the housing so that the assembly 100 and overload switch 170 can be easily installed together on the lower end frame.

The assembly 100 attaches to the lower end frame in one direction. As the assembly 100 is moved adjacent the lower end frame, the first and second retainers 124 and 126 are pressed into slots defined in the lower end frame, and the reset button 172 of the switch 170 is disposed through a hole (not shown) defined in the lower end frame. The second retainers 126 flex away from the overload switch 170 as they are inserted into the slots. The shoulders 127b of the second retainers 126 then engage one side of the lower end frame, as do the shoulders 125b of the first retainers 124. Being triangular, the first and second retainers 124 and 126 both facilitate attachment of the assembly 100 to the lower end frame for both manual and automated procedures. In addition, the fact that the first retainers 124 are angled opposite to the second retainers 126 further helps to align the assembly 100 adjacent the slots defined in the lower end frame. With the retainers 124 and 126 installed, the ledges 121 engage the opposite side of the lower end frame. The tabs 128 disposed on the top of the housing 120 contact or press firmly against the top of the overload switch 170. Thus, the bottom of the overload switch 170 is positively held by the housing 120 against the opposite surface of the lower end frame.

As noted earlier in the prior art, an operator was required to keep the overload switch 170 stabilized within the prior art assembly while attaching it to the lower end frame. Moreover, any automated attempts to assemble the overload switch 170 using the prior art assembly and attach them to the lower end frame would typically required holding the overload switch 170 and prior art assembly together. However, according to one embodiment of the disclosed invention, the operator may now "snap" the overload switch 170 into place in the switch assembly 100 by sliding the overload switch 170 past the deformable retainers 126. The overload switch 170 is positively held in the housing 120 before and during attachment to the lower end frame, which greatly simplifies automated assembly.

The embodiment of the switch assembly 100 has a number of additional advantages over the prior art. The arrangement of the terminals 181–183 allows the leads L1–L3 of the motor to be connected to the switch assembly 100 and switch 170 from one direction. This is because, unlike the prior art, the terminals 181, 182, and 183 lie on the same side 110 of the assembly 100, as best shown in FIG. 4A. By contrast, the switch assemblies in the prior art described above with reference to FIGS. 2A and 2B have terminals extending in different directions to receive the leads. For example, on the switch 60a depicted in FIG. 2A, the terminals 81–83 extend in three different directions and receive separate terminal connectors 91–93 in three mating operations.

Having the three motor leads L1–L3 connect to the terminals 181–183 on the same side 110 of the assembly 100 allows for more accurate attachment of the leads when assembling the switch 100. Additionally, having the three leads L1–L3 connect to terminals 181–183 on the same side 110 may be better suited to the space limitations that exist at the bottom of the disposer. Moreover, having the three leads L1–L3 connect to terminals 181–183 on the same side 110 allows the leads to be pre-assembled and housed in a common connector assembly 200 illustrated in FIGS. 6A–6C.

Figure 6A:
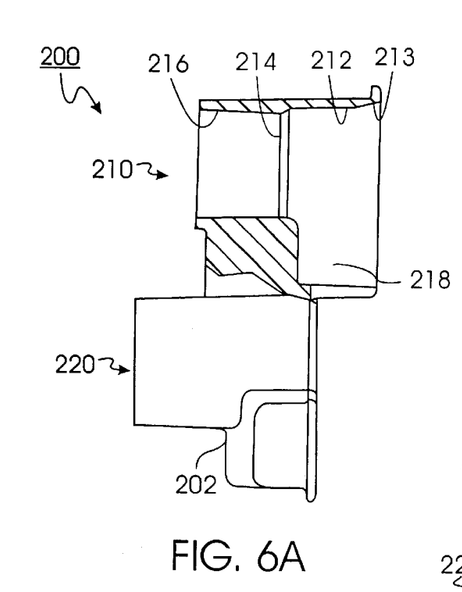
Figure 6B:
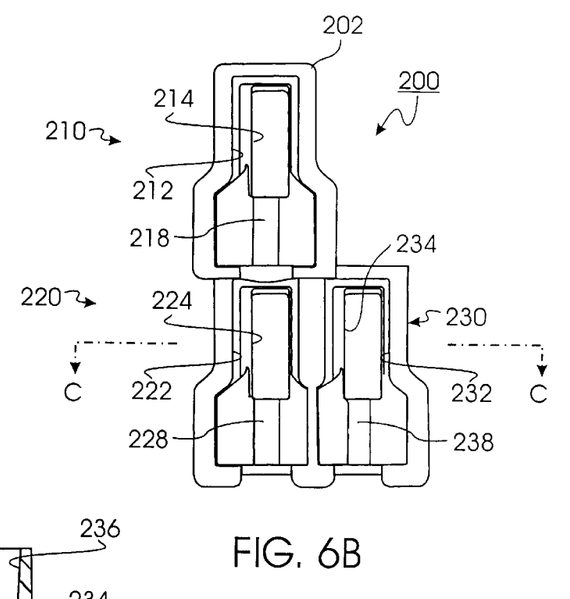
Figure 6C:
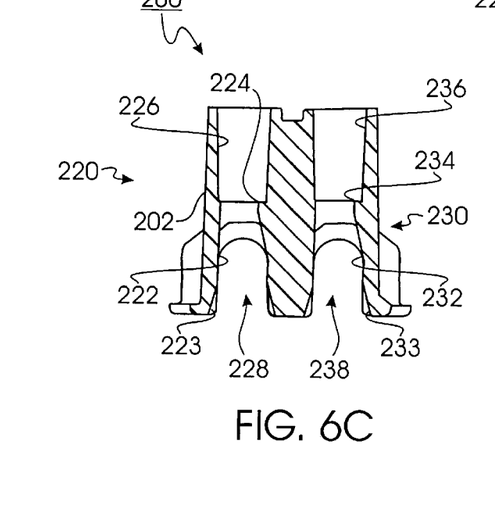

In FIGS. 6A–6C, the common connector assembly 200 is illustrated in a side view with partial cross section, a back view, and an end cross-sectional view, respectively. The connector assembly 200 is a one piece connector for three leads, corresponding to leads L1–L3. The connector assembly 200 includes a body 202, which is preferably molded from nylon. The body 202 has three housings 210, 220, and 230. Each housing 210, 220, and 230 defines a passage 212, 222, and 232 and a cavity 216, 226, and 236. Preferably, the passage 212, 222, and 232 defines one or more slanted surfaces or guides 213, 223, and 233 to facilitate insertion of terminal connectors into the housings 210, 220, and 230.

Figure 10A:
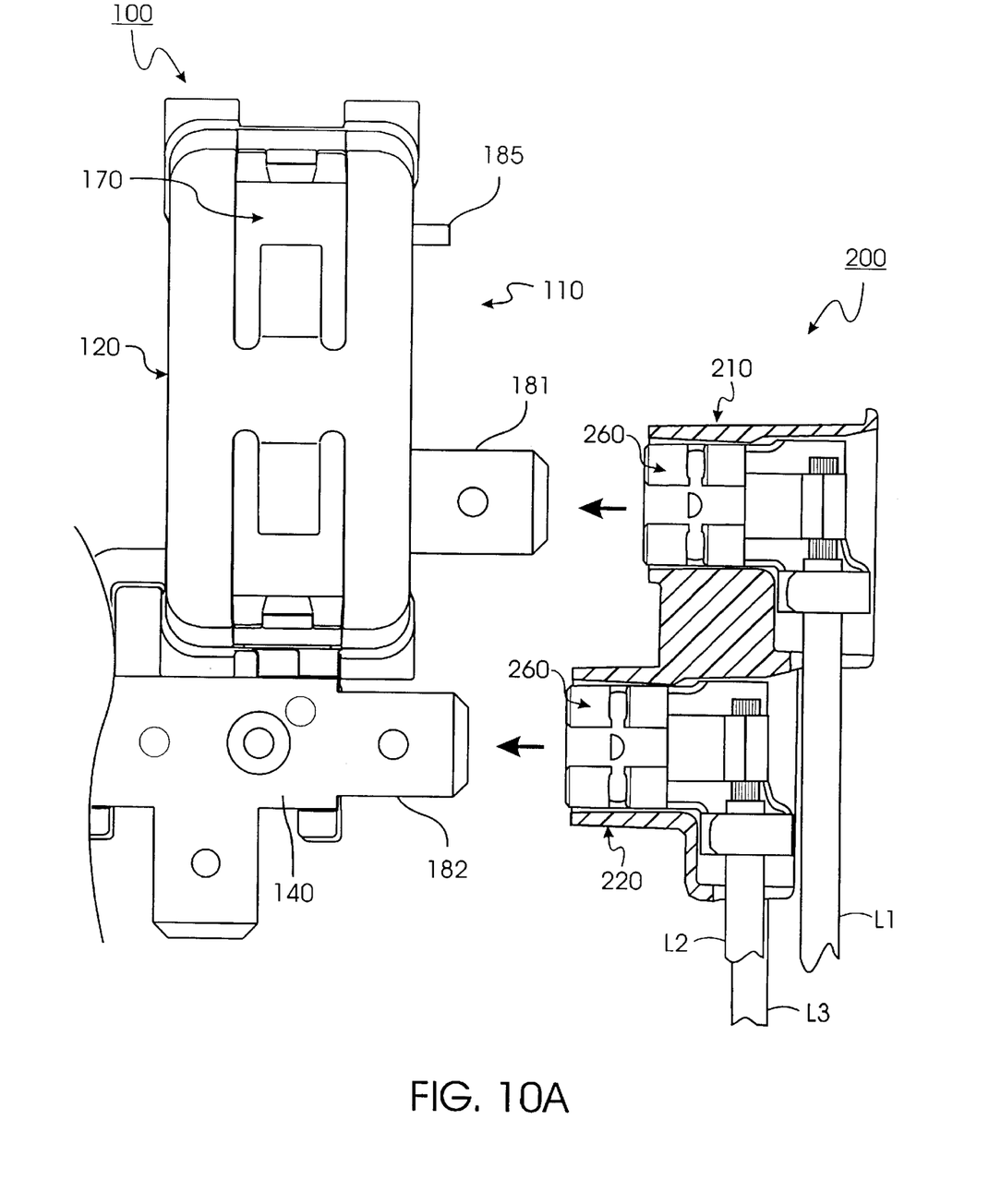
FIGS. 10A and 10B illustrate connection of the connector assembly to the switch assembly in accordance with the present invention.
Figure 10B:
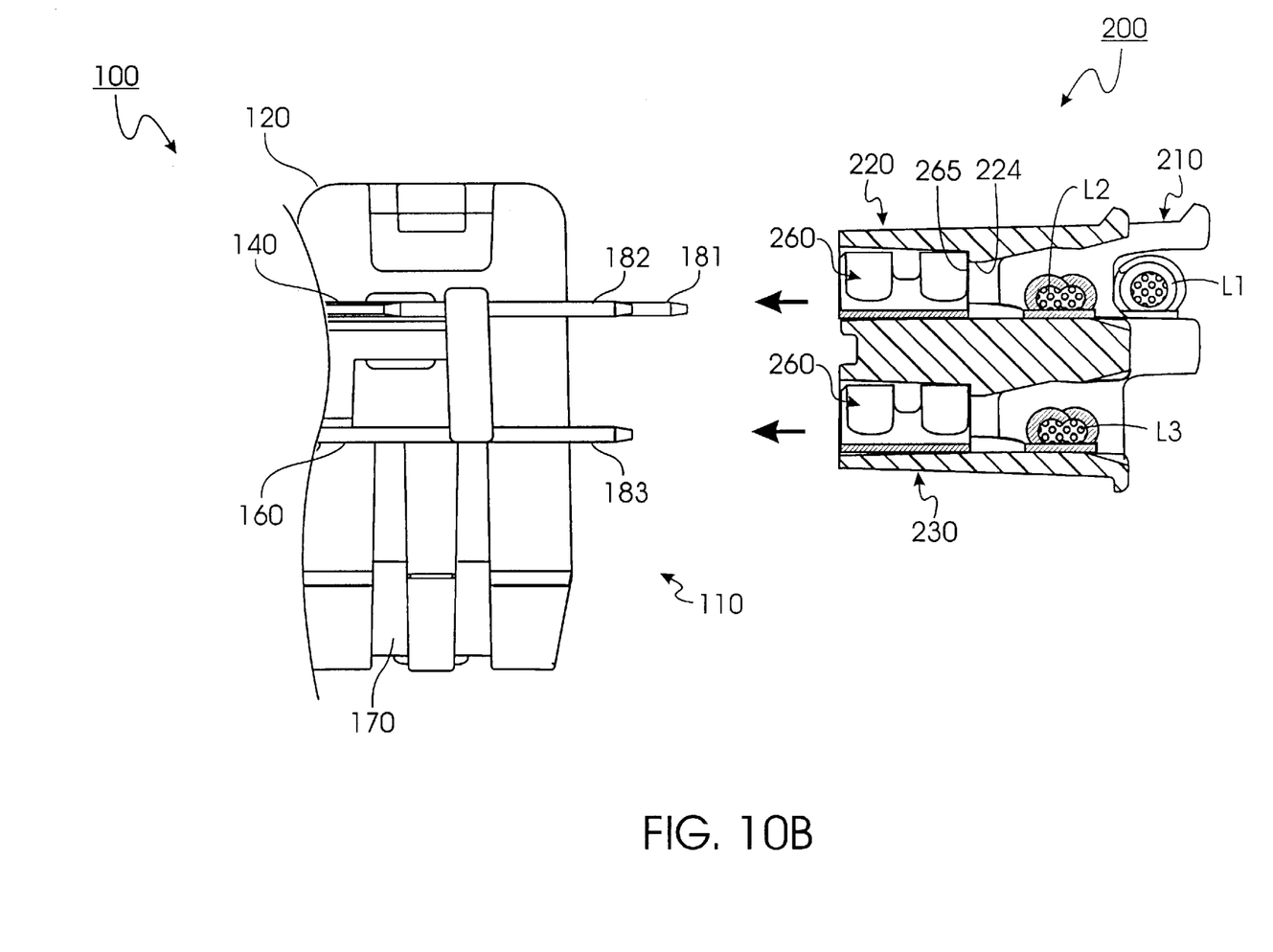

A reverse stopping surface or locking ramp 214, 224, and 234 is defined between the passage 212, 222, and 232 and the cavity 216, 226, and 236. The reverse stopping surface 214, 224, and 234 may extend, for example, approximately 0.027-inch into the passage 212, 222, and 232. The reverse stopping surface 214, 224, and 234 engages a back edge of a terminal connector (not shown) when inserted into the cavity 216, 226, and 236, as best shown in FIGS. 10A and 10B below. Each housing 210, 220, and 230 also defines a wire slot 218, 228, and 238 for a lead wire (not shown).

Figure 7A:
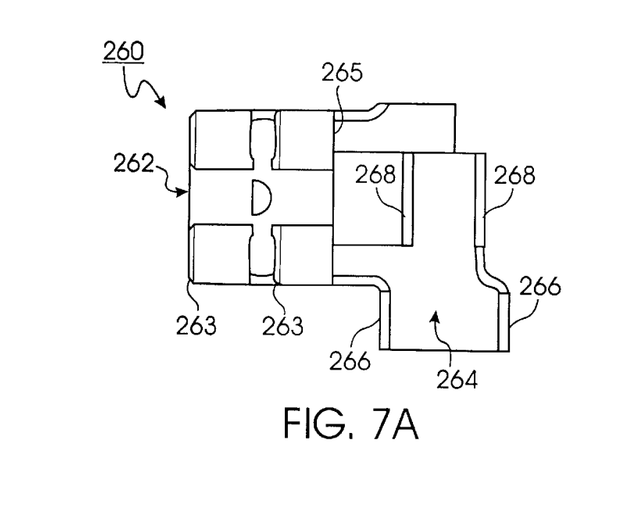
FIGS. 7A and 7B illustrate various views of an embodiment of a female flag terminal for use in the connector assembly of FIGS. 6A–6C.
Figure 7B:
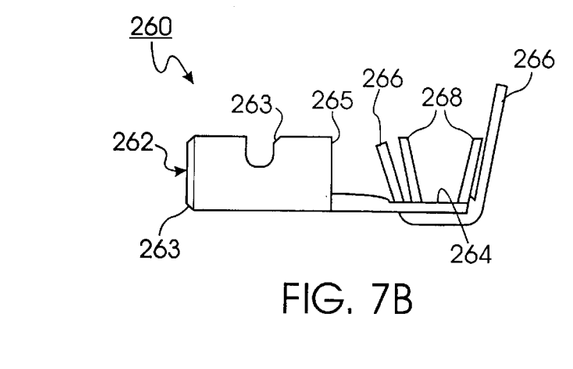

The housings 210, 220, and 230 receive terminal connectors attached to leads from the motor. In a preferred embodiment, a flag terminal as illustrated in FIGS. 7A and 7B is connected to a lead from the motor and disposed in the housings 210, 220, or 230. In FIGS. 7A and 7B, an embodiment of a flag terminal 260 is illustrated in a top view and a side view. The flag terminal 260 can be composed of brass, tin-plated brass, nickel-plated steel, or the like and can be formed from stock having a thickness of approximately 0.0116-inch.

The flag terminal 260 includes a terminal portion 262 for connection to a terminal of the switch assembly (not shown) and includes an attachment portion 264 for attachment to a lead wire (not shown). The attachment portion 264 includes first crimp bands 266 and second crimp bands 268. The first crimp bands 266 hold the insulation of the lead. The second crimp bands 268 hold a wire of the lead. The lead wire used with the flag terminal 260 may be sized, for example, from 18 gauge to 14 gauge. The lead wire is attached perpendicularly to the terminal portion 262, as best shown in FIG. 10A.

The terminal portion 262 includes flag curls to allow the terminal portion 262 to mate with the male terminals 181–183 of the switch assembly as described below. The terminal portion 262 includes leading edge 263 and a back edge 265. Preferably, the leading edges 263 are chamfered. The back edge 265 is intended to engage the reverse stopping surfaces 214, 224, and 234 of the connector assembly 200 as described below.

During manufacture and assembly of the connector assembly 200, the flag terminal 260 is crimped to the lead wire and is then inserted into the connector assembly. In a preferred embodiment of the present invention, the flag terminal 260 is inserted into the connector assembly 200 of FIGS. 6A–6C using a special insertion or wedging tool. The wedging tool is shown in relevant detail in FIGS. 8A–8C and is shown in FIG. 9.

Figures 8A, 8C:
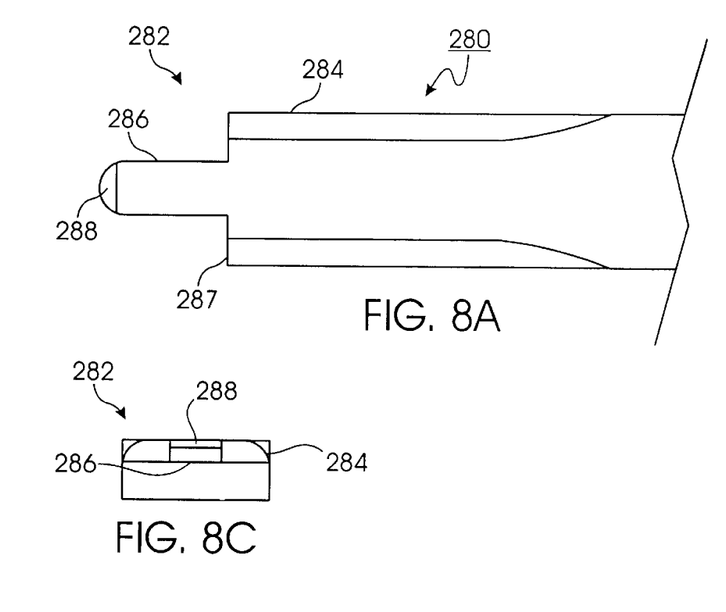
FIGS. 8A–8C illustrate various views of an embodiment of a wedging tool in accordance with the present invention.
Figure 8B:
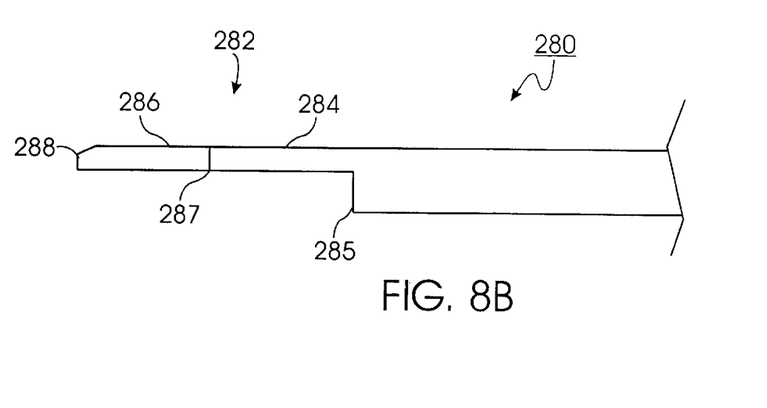
Figure 9:
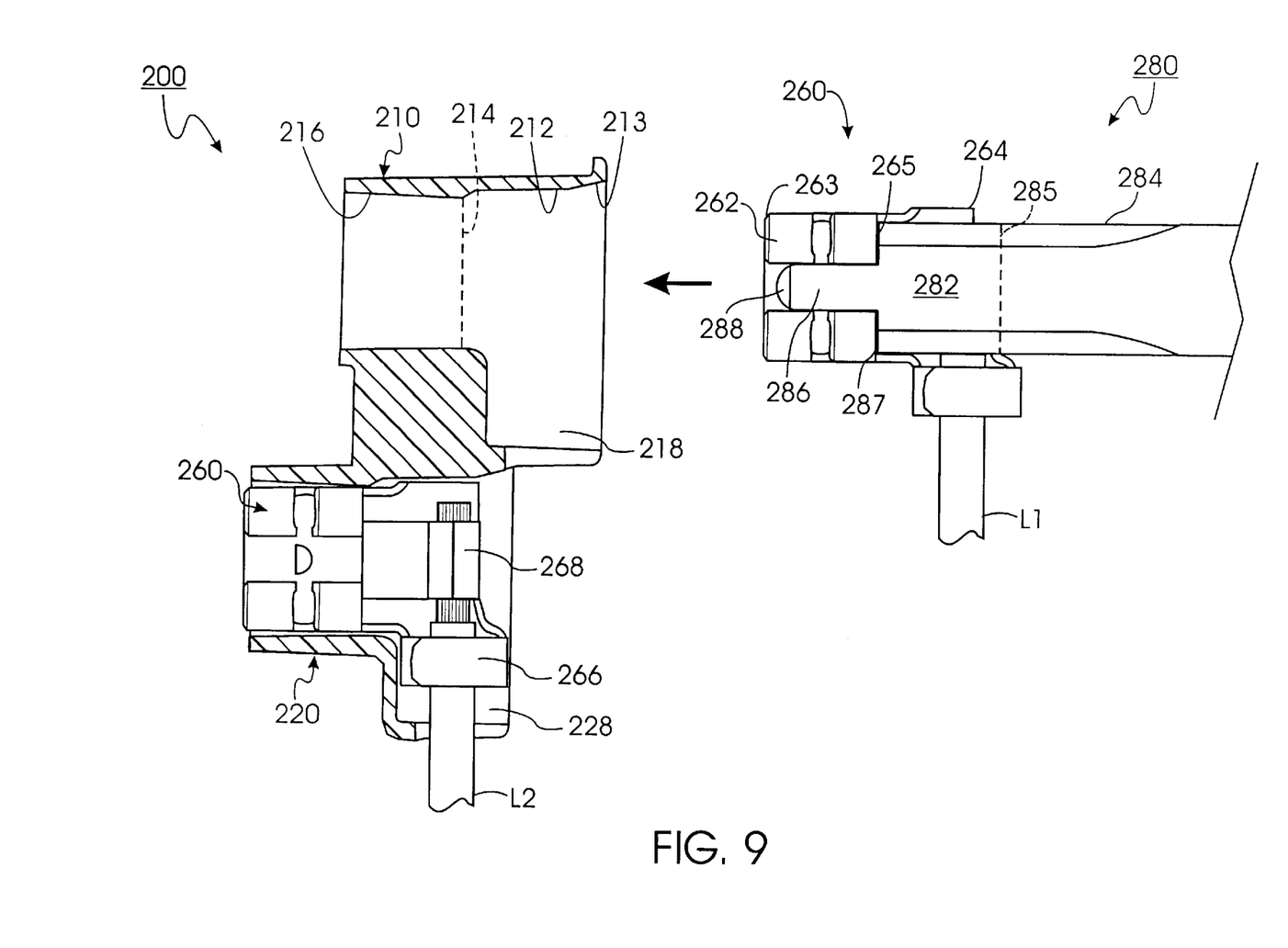
FIG. 9 illustrates insertion of female flag terminals into the connector assembly using the wedging tool in accordance with the present invention.

Referring to FIGS. 8A–8C, an embodiment of a wedging tool used to insert the flag terminals into the connector assembly 200 is illustrated in a side view, a top view, and an end view, respectively. The wedging tool 280 includes an insertion or wedging is bit 282. In one embodiment, the wedging tool 280 is intended for manual use and can include a handle portion (not shown) attached to the wedging bit 282. As will be readily apparent to those skilled in the art, however, automated procedures and techniques can accomplish the insertion of the flag terminals into the connector assembly.

The insertion or wedging bit 282 may be composed of steel and may have a hardness of approximately 50 to 54 Rockwell. The insertion or wedging bit 282 includes a first portion or body 284 having a second portion or tip 286 extending therefrom. The first portion or body 284 is approximately 0.300-inch wide and approximately 0.042-inch thick. The top surface of the first portion or body 284 has rounded longitudinal edges. As described below, the rounding of the edges may prevent damage to the connector assembly 200 when the bit 282 is used to insert a flag terminal 260 therein. The bottom surface of the body 284 defines a stop 285 where the thickness of the body is approximately 0.115-inch.

Extending from the body 284, the first portion or tip 286 is substantially flat and narrow. A shoulder 287 is defined between the body 284 and the tip 286. The tip 286 has the same thickness as the narrower portion of the body 284 and is approximately 0.042-inch thick. The tip 286 is approximately 0.100-inches wide, which corresponds to the distance between the flag curls on the sides of the terminal portion 262 of the flag terminal 260. The tip 286 is approximately 0.240-inches long, which corresponds to the length of the terminal portion 262 of the flag terminal 260. The distal end 288 of the tip 286 is rounded and has a top edge that is angled at approximately 25-degrees. The distance from the stop 285 on the body 284 to the distal end 288 of the tip 286 is approximately 0.500-inches.

The insertion or wedging bit 282 is used to install flag terminals into the housings of the connector assembly. Referring to FIG. 9, the insertion or wedging tool 280 is shown with a flag terminal 260 on the insertion bit 282. The tool 280 is shown ready for inserting the flag terminal 260 into the housing 210 of the connector assembly 200. The connector assembly 200 is shown in cross section to reveal internal details, such as another flag terminal 260 already installed in housing 220.

After the crimp bands 266 and 268 of the attachment portion 264 have been crimped to the wire lead, the flag terminal 260 is disposed on the insertion or wedging bit 282 as shown. In particular, the tip 286 is inserted into the terminal portion 262 of the flag terminal 260 from the back edge 265. The shoulder 287 engages the back edge 265, which stops the depth of the insertion of the tip 286 into the terminal portion 262. The stop 285 of the body 284 may also engage the edge of the attachment portion 264.

The terminal portion 262 is inserted into the passageway 212 of the housing 210. In manual assembly, an operator holds a handle portion (not shown) of the tool 280 to insert the flag terminal 260. The passageway 212 initially receives the terminal portion 262 and later houses the attachment portion 264. The slanted surfaces or guides 213 facilitate insertion of the flag terminal 260. In addition, the chamfered leading edges 263 of the terminal 260 reduce or prevent scraping material of the housing 210 when the terminal 260 is inserted into the connector assembly 200.

The terminal portion 262 is inserted until the back edge 265 passes the reverse stopping surface 214. The terminal portion 262 is then positively install&d and retained in the cavity 216. During insertion, the bit 282 does not interfere with the connector assembly 200. The operator then pulls the tip 286 out of the terminal portion 262, which is held in the cavity 216 by the engagement of the back edge 265 and the reverse stopping surface 214.

Referring to FIGS. 10A and 10B, flag terminals 260 are shown installed in the connector assembly 200. In FIG. 10A, a top cross-section of the connector assembly 200 reveals flag terminals 260 installed in housings 210 and 220. In FIG. 10B, a side cross-section of the connector assembly 200 reveals flag terminals 260 installed in housings 210, 220 and 230.

When installed, the internal walls of the cavity 216, 226, and 236 and the reverse stopping surfaces 214, 224, and 234 retain the flag terminals 260. Forward motion is prevented by interference between the passages 218, 228, and 238 and the attachment portions 264 of the flag terminals 260. Interference between the stopping surfaces 214, 224, and 234 with the rear edges 265 of the terminal portions 262 prevents removal of the flag terminals 260.

With the flag terminals 260 and leads L1–L3 installed, the connector assembly 200 couples to the terminals 181–183 on one side 110 of the switch assembly 100. In FIG. 10A, connection between the switch assembly 100 and the connector assembly 200 is shown from the top. In FIG. 10B, connection between the switch assembly 100 and the connector assembly 200 is shown from the side.

The first housing 210 houses the flag terminal 260 connected to lead L1 associated with both the run and start windings of the motor and is designed to connect with the first terminal 181 of the overload switch 170. The second housing 220 houses the flag terminal 260 connected to lead L2 from the run windings of the motor and is designed to connect with the second terminal 182 of the assembly 100. The third housing 230 houses the flag terminal 260 connected to lead L3 from the start windings of the motor and is designed to connect with the third terminal 183 of the assembly 100.

Instead of performing three mating operations as seen in the prior art, an operator uses the single connector assembly 200 to simultaneously connect the three motor lead wires L1–L3 to the appropriate terminals 181–183 of the switch assembly 100. The single connector assembly 200 allows this portion of the manufacturing process to become automated. Furthermore, the single connector assembly 200 reduces or eliminates the possibility of connecting a lead to the wrong terminal of the switch assembly 100 by a manufacturing operator.

As best shown in FIG. 10A, the first housing 210 is positioned further back from the second housings 220, as the first terminal 181 associated with the overload switch 170 extends further from the first side 110 of the switch assembly 100 than the second terminal 182. Having the first housing 210 further back from the second housing 220 allows the lead wire L1 to extend unhindered from the housing 210. Moreover, the position of the first housing 210 differentiates the lead wire L1 associated with the overload switch 170 when assembling the lead wires L1–L3 to the connector assembly 200.

As best shown in FIG. 10B, the second and third housings 220 and 230 are aligned one above the other, as the second and third terminals 182 and 183 are positioned parallel in the assembly 100. Moreover, the second and third housings 220 and 230 are flush with one another, as the second and third terminals 182 and 183 extend for substantially equivalent lengths from the first side 110 of the assembly 100. The arrangement of the terminals 181–183 on the switch assembly 100 allows the connector assembly 200 to align in only one orientation with respect to the terminals 181–183, thus facilitating the connection, and obviating the possibility of connecting the wrong lead to the switch assembly 100.

Due to inventive aspects of the switch assembly 100 and connector assembly 200 of the disclosed invention, assembling a waste disposer having a motor with three leads L1–L3 is greatly simplified. During the assembly of the disposer, the three leads L1–L3 of the motor are housed in common. To house the leads L1–L3 in common, terminal connectors 260 are attached to each lead L1–L3 and are installed and retained in the common connector assembly 200. Before affixing the switch assembly 100 to the disposer, the overload switch 170 is positively retained in the switch assembly 100. The overload switch 170 is snapped into place in the switch assembly 100 by sliding the overload switch 170 past deformable retainers 126.

The switch assembly 100 is then affixed to the disposer. To affix the switch assembly 100, deformable retainers 124 on the switch assembly 100 are snapped into slots defined in a lower end frame of the disposer. Finally, the three leads L1–L3 of the motor are simultaneously connected to one side of the switch assembly 100. Terminal connectors 260 attached to the leads L1–L3 and housed in the common connector assembly 200 are simultaneously mated to three terminals 181–183 extending from the one side of the switch assembly 100. The three leads L1–L3 are permitted to connect to the switch assembly 100 in only one orientation, because the three leads L1–L3 are housed with an asymmetrical arrangement in the common connector assembly 200.

Thus, the design of the connector assembly 200 allows it to be properly pre-assembled with the leads L1–L3 and flag terminals 260. The switch assembly 100 and the connector assembly 200 provide for easier connection of the leads L1–L3 to the motor terminals 181–183 either manually or through automation. Finally, the use of the single connector assembly 200 connecting in one direction to one side of the switch assembly 100 is more ergonomic for an operator performing the assembly. Thus, the switch assembly 100 and connector assembly 200 greatly simplify the manufacture of the disposer and reduces the chances of improper connection of the leads from the motor as compared to the prior art discussed above.

While the present invention has been described with respect to particular embodiments, one should not understand these embodiments to limit the scope of the various aspects of the invention, which instead is defined by the below claim language and its equivalents.

What is claimed is:

1. A switch assembly connectable to the run and start windings of a motor in an appliance, comprising:
    a body having a power terminal for receiving a power voltage from a power supply for the run and start windings;
    a contact switch formed in the body and responsive to an actuator for disconnecting the power voltage from the start winding; and
    first, second, and third motor terminals, wherein the motor terminals extend from the body in a common direction, and wherein
        the first motor terminal is connectable to a first end of the run winding to provide the power voltage to the run winding,
        the second motor terminal is connectable to a first end of the start winding to provide the power voltage to the run winding when not interrupted by the contact switch, and
        the third terminal is connectable to a second end of the run winding and a second end of the start winding, and wherein the third terminal is coupleable to the power supply.

2. The switch assembly of claim 1, further comprising an overload switch to disconnect the power supply from the start and run windings.

3. The switch assembly of claim 2, wherein the overload switch is housed within the body.

4. The switch assembly of claim 3, wherein the body further comprises secondary retainers for temporarily holding the overload switch when attaching the switch assembly to the appliance.

5. The switch assembly of claim 3, wherein the overload switch is retained within the body by tabs.

6. The switch assembly of claim 1, wherein the third terminal extends from the overload switch.

7. The switch assembly claim 1, wherein the contact switch comprises:
   a first blade movable with the mechanical actuator and electrically connected to the first terminal, and
   a second blade electrically connected to the second terminal.

8. The switch assembly of claim 1, wherein the first terminal and the second terminal extend for a substantially equivalent length away from the body.

9. The switch assembly of claim 8, wherein the third terminal extends farther away from the body than does the first and second terminals.

10. The switch assembly of claim 9, wherein the first terminal is substantially aligned above the second terminal.

11. The switch assembly of claim 1, further comprising a connector assembly connectable to the first, second and third terminals, the connected assembly containing leads for connection to the first and second ends of the start and run windings.

12. The switch assembly of claim 1, wherein the body further comprises primary retainers for affixing the switch assembly to the appliance.

13. The switch assembly of claim 1, wherein the appliance is a food waste disposer.

14. A switch assembly connectable to a motor in an appliance having a start and run winding, comprising:
   a body, comprising
      first retainers for affixing the switch assembly to the appliance, and
      second retainers for positively retaining an overload switch prior to affixing the switch assembly to the appliance; and
   a contact switch formed in the body for disconnecting a power voltage from the start winding.

15. The switch assembly of claim 14, wherein the first and second retainers are located on the same side of the switch assembly.

16. The switch assembly of claim 15, wherein the second retainers are located between the first retainers.

17. The switch assembly of claim 14, wherein the first and second retainers are deformable.

18. The switch assembly of claim 17, wherein the first and second retainers are triangular in shape.

19. The switch assembly of claim 14, wherein the second retainers further affix the switch assembly to the appliance once.

20. The switch assembly of claim 14, further comprising:
   first, second, and third motor terminals, wherein the motor terminals extend from the body in a common direction, and wherein
      the first motor terminal is connectable to a first end of the run winding to provide the power voltage to the run winding,
      the second motor terminal is connectable to a first end of the start winding to provide, the power voltage to the run winding when not interrupted by the contact switch, and
      the third terminal is connectable to a second end of the run winding and a second end of the start winding, and wherein the third terminal is coupleable to the power supply.

21. The switch assembly of claim 20, wherein the third terminal extends from the overload switch.

22. The switch assembly claim 20, wherein the contact switch comprises:
   a first blade movable with the mechanical actuator and electrically connected to the first terminal, and
   a second blade electrically connected to the second terminal.

23. The switch assembly of claim 20, wherein the first terminal and the second terminal extend for a substantially equivalent length away from the body.

24. The switch assembly of claim 23, wherein the third terminal extends farther away from the body than does the first and second terminals.

25. The switch assembly of claim 24, wherein the first terminal is substantially aligned above the second terminal.

26. The switch assembly of claim 20, further comprising a connector assembly connectable to the first, second and third terminals, the connected assembly containing leads for connection to the first and second ends of the start and run windings.

* * * * *